United States Patent Office 3,563,915
Patented Feb. 16, 1971

3,563,915
PROCESS FOR LOWERING THE PYROPHORISM OF A NICKEL-ALUMINUM OR COBALT-ALUMINUM CATALYST
Roy J. Eisenhauer and John H. Lester, Jr., Pensacola, Fla., assignors to Monsanto Company, St. Louis, Mo., a corporation of Delaware
No Drawing. Continuation-in-part of application Ser. No. 701,110, Jan. 29, 1968. This application Sept. 3, 1969, Ser. No. 855,029
Int. Cl. B01j *11/08, 11/22*
U.S. Cl. 252—466    6 Claims

ABSTRACT OF THE DISCLOSURE

The pyrophorism of a nickel-aluminum or cobalt-aluminum catalyst can be substantially lowered by contacting the catalyst with an aqueous solution containing an effective passivating amount of dichromate or permanganate ion.

CROSS-REFERENCE TO RELATED APPLICATION

This application is a continuation-in-part of our copending application Ser. No. 701,110 which was filed on Jan. 29, 1968, and now abandoned.

BACKGROUND OF THE INVENTION

A variety of foraminous catalysts have been disclosed in patents of which U.S. Pat. No. 1,915,473 to Raney is representative. These catalysts are generally prepared by sequentially alloying a metal suitable for use in catalytic hydrogenation (e.g. nickel or cobalt) with aluminum and then dissolving portions of the aluminum as increased activity is desired. The alloys may initially contain between about 5% and about 95% by weight of aluminum and a remainder of the hydrogenation metal. The dissolution or activation procedure, which can be conveniently carried out with a potassium or sodium hydroxide solution, may be repeated several times during the life of the catalyst. Eventually, of course, a condition is reached when the catalyst can no longer be sufficiently regenerated for practical use and must be discarded.

Although the spent material is no longer economically attractive as a hydrogenation catalyst, it normally still possesses some activity. In fact, the activity of the spent catalyst is generally sufficient to render the material pyrophoric under ambient conditions. If permitted, the pyrophorism gradually raises the temperature of the catalyst to a point where it incandesces. Since the incandescent material can readily kindle fires, disposal of the spent catalyst is a problem.

It will be understood that pyrophorism is not limited to the spent catalyst. Raney nickel may, in fact, be pyrophoric at any stage of its life. In use or otherwise, however, the catalyst is generally isolated from the atmosphere so that pyrophorism does not become a problem until the catalyst is discarded.

It is an object of this invention, therefore, to provide a process for passivating or substantially lowering the pyrophorism of a nickel-aluminum or cobalt-aluminum catalyst. Another object is the provision of a process for treating a spent nickel-aluminum or cobalt-aluminum catalyst so that it can be discarded without substantial danger of pyrophorism.

SUMMARY OF THE INVENTION

It has now been discovered that the aforedescribed problem of pyrophorism can be substantially eliminated by contacting the nickel-aluminum or cobalt-aluminum catalyst with an aqueous solution containing an effective passivating amount of dichromate or permanganate ion.

DETAILED DESCRIPTION OF THE INVENTION

The aqueous solutions used for catalyst passivation in the process of this invention can be prepared by dissolving any of a great variety of dichromate or permanganate compounds in water. Suitable compounds include the water-soluble dichromate and permanganate salts of sodium, potassium, calcium, barium, ammonium and other alkali and alkaline earth metals. Sodium dichromate and potassium permanganate are especially preferred.

The important process variables, in addition to the specific passivating ion, are the interrelated amount and concentration of the dichromate or permanganate ion in the aqueous solution and the time and temperature of contact between the aqueous solution and the catalyst to be passivated. As shown by Examples III–XIII, the pH of the aqueous solution can be varied throughout the entire range of acidic and alkaline values and the effectiveness of the process of this invention is therefore not dependent on the solution having a pH within any particular range.

Passivation of the pyrophoric catalyst can also be achieved with aqueous solutions containing virtually any concentration of the dichromate or permanganate ions although equivalent results are normally obtained with substantially lower concentrations of the dichromate ion. For example, aqueous solutions containing 0.2–10% by weight of potassium permanganate are generally suitable whereas solutions containing 0.05–3% by weight of sodium dichromate are usually adequate. Especially preferred for substantially complete passivation of the catalyst are solutions containing 0.1–1% of sodium dichromate or 0.5–3% of potassium permanganate.

If a compound other than sodium dichromate or potassium permanganate is employed, the corresponding solution concentration can be easily determined by known gravimetric principles, i.e., by calculation of stoichiometric equivalents. Of course, solutions containing higher concentrations than those mentioned hereinbefore are also effective. The preferred concentration is generally not affected significantly by impurities in the solution and such impurities can be tolerated in virtually any proportion so long as they do not interfere to prevent substantial passivation of the catalyst.

For convenience, the amount of the dichromate or permanganate ion needed to substantially lower the pyrophorism of the catalyst is referred to herein as an "effective passivating amount." The amount of passivating ion required for substantially complete catalyst passivation is generally less and typically much less than the amount of catalyst to be deactivated. For example, substantially complete passivation is usually achieved with the use of 0.5–1 gram of potassium permanganate (i.e., 0.375–0.75 gram of permanganate ion) per gram of catalyst and similar results are generally obtained with the use of 0.04–0.5 gram of sodium dichromate (i.e., 0.033–0.412 gram of dichromate ion) per gram of catalyst. The amount of dichromate ion that is sufficient for substantially complete passivation of the catalyst is surprisingly small in relation to the amounts of other known oxidizing agents (sodium nitrate, sodium hypochlorite, etc.) that are needed to provide a similar result.

Any convenient temperature above about 0° C. can be used in the process of this invention, for example up to about 50° C. or higher. Ambient or room temperature is normally satisfactory. For substantial lowering of the pyrophorism of the catalyst, the time of contact between the catalyst and the aqueous solution may be varied as desired between about 30 seconds and three hours or longer. About 2–30 minutes is usually adequate for substantially complete elimination of pyrophorism with a solution containing 0.1–1% of sodium dichromate. Similar results are generally obtained with a solution containing 0.5–3% of potassium permanganate in 5–30 minutes. After contact with the aqueous solution of passivating ion and withdrawal from the solution, the catalyst remains non-pyrophoric when dried.

Those skilled in the art will recognize that the passivation process of this invention is not limited to spent catalysts but may be applied to the catalyst at any time during its life to inhibit pyrophorism. The mechanism by which the passivation proceeds is not fully understood. It may be due to the formation of an oxide film over the catalytic surface. However, other oxidizing agents such as sulfites and thiosulfites do not provide the desired effect and still others require considerably greater amounts (as aforesaid) and/or longer contact times to achieve substantially complete passivation. For example, a solution containing 2.2% of sodium nitrate normally requires a contact time of at least about 30 minutes to provide the substantially complete passivation that is obtained with the same amount of a solution containing 0.1% of sodium dichromate in fifteen minutes or a like amount of a solution containing 1% of potassium permanganate in thirty minutes. Chlorides, sulfides, carbonates and bicarbonates provide no significant passivation. The effect of the permanganate ion and particularly the dichromate ion is thus very specific.

The following examples are included for purposes of illustration only and do not represent any limitations on the scope of the invention. Percentages are by weight except where noted otherwise.

EXAMPLE I

A ten-gram sample of a highly pyrophoric hydrogenation catalyst containing about 92% nickel and 8% aluminum was submerged in 500 milliliters of an aqueous solution containing 0.08% of sodium dichromate (0.04 gram of sodium dichromate per gram of catalyst) at 25.5° C. and the resulting mixture was agitated for 15 minutes, after which the treated catalyst was removed from the solution by vacuum filtration and dried. There was no substantial rise in temperature of the solution during contact with the catalyst. When exposed to air, the dried catalyst was completely free of pyrophorism and did not increase in temperature.

EXAMPLE II

When the procedure of Example I was repeated with the exception that the solution contained 1% of potassium permanganate (0.5 gram of potassium permanganate per gram of catalyst) instead of the sodium dichromate and agitation was continued for 30 minutes, the results were the same. That is, the temperature of the solution did not rise during contact with the catalyst and the dried catalyst, when exposed to air, was completely free of pyrophorism and did not increase in temperature.

COMPARATIVE EXAMPLE A

When the procedure of Example I was repeated with the exception that the catalyst was submerged for one hour in pure water containing no sodium dichromate or other salt, the dried catalyst was highly pyrophoric. When exposed to air, the dried catalyst began to generate a vapor within a few seconds and soon became red hot and ignited the filter paper.

COMPARATIVE EXAMPLE B

When the procedure of Example I was repeated with the exception that the solution contained 2.0% of sodium nitrate (one gram of sodium nitrate per gram of catalyst) instead of the sodium dichromate and agitation was continued for 30 minutes, the dried catalyst was sufficiently pyrophoric that when exposed to air, it began to generate a vapor within a few seconds and soon became red hot and ignited the filter paper.

COMPARATIVE EXAMPLE C

When the procedure of Example I was repeated with the exception that the solution contained 0.38% of sodium hypochlorite (0.19 gram of sodium hypochlorite per gram of catalyst) instead of the sodium dichromate and agitation was continued for 30 minutes, the dried catalyst was sufficiently pyrophoric that when exposed to air, it began to generate a vapor within a few seconds and soon became red hot and ignited the filter paper. During the passivation process, an undesirable gas was generated and highly corrosive chloride salts were formed in the aqueous solution.

EXAMPLES III–XIII

To demonstrate that the effectiveness of the process of this invention is independent of the pH of the passivating solution, ten-gram samples of a highly pyrophoric hydrogenation catalyst containing about 92% nickel and 8% aluminum were submerged in 500-milliliter agitated aqueous solutions containing 4.4% of sodium dichromate (in Examples III through VII) or 5% of potassium permanganate (in Examples VIII through XIII). By the addition of 98% sulfuric acid or 50% sodium hydroxide, the pH's of the solutions had been previously adjusted to the values shown in the following table. (The sodium dichromate and potassium permanganate solutions without pH adjustment had pH's of 3.9 and 8.5, respectively.) The catalyst samples were removed from the solutions by vacuum filtration after the periods of time shown in the table. The initial and final temperatures of the solutions are also set forth in the table. After drying of the samples, it was found in every Example (III through XIII) that when exposed to air, the dried catalyst was completely free of pyrophorism and did not increase in temperature.

CATALYST PASSIVATION IN SOLUTIONS OF ADJUSTED pH

| Passivating agent | | Solution pH | Contact time, minutes | Initial solution temperature, °C. | Final solution temperature, °C |
|---|---|---|---|---|---|
| Example: | | | | | |
| III | Sodium dichromate | 1.0 | 3 | 30 | 32 |
| IV | do | 2.0 | 5 | 30 | 30 |
| V | do | 3.0 | 5 | 29 | 29 |
| VI | do | 5.0 | 5 | 31 | 31 |
| VII | do | 11.0 | 3 | 29 | 30 |
| VIII | Potassium permanganate | 1.0 | 2 | 23 | 40 |
| IX | do | 2.0 | 10 | 25 | 32 |
| X | do | 3.0 | 5 | 25 | 30 |
| XI | do | 5.0 | 5 | 27 | 27 |
| XII | do | 11.1 | 3 | 23 | 28 |
| XIII | do | 12.2 | 5 | 24 | 25 |

We claim:
1. A process for substantially lowering the pyrophorism of a pyrophoric Raney nickel-aluminum or cobalt-aluminum catalyst which comprises contacting the catalyst with an aqueous solution of an alkali metal, alkaline earth metal or ammonium dichromate containing from 0.033 to 0.412 gram of dichromate ion per gram of said catalyst at a temperature between about 0° and about 50° C. for at least about 30 seconds.

2. A process as defined in claim 1, in which the solution contains at least about 0.1% by weight of sodium dichromate.

3. A process as defined in claim 3, in which the catalyst is contacted with the solution for 2–30 minutes.

4. A process as defined in claim 1, in which the catalyst is contacted with a solution containing at least about 0.04 gram of sodium dichromate per gram of catalyst.

5. A process as defined in claim 1, in which the solution contains at least 0.05% by weight of sodium dichromate.

6. A process as defined in claim 1, in which the solution contains from 0.05% to 3% by weight of sodium dichromate.

References Cited

UNITED STATES PATENTS

| | | | |
|---|---|---|---|
| 3,425,959 | 2/1969 | Haddad | 252—459 |
| 2,893,181 | 7/1959 | Burroughs | 51—282 |
| 3,170,785 | 2/1965 | Phillips | 75—.5 |

OTHER REFERENCES

Kirk-Othmer, Encyc. of Chem. Technology, vol. 9, pp. 679–681.

DANIEL E. WYMAN, Primary Examiner

P. M. FRENCH, Assistant Examiner

U.S. Cl. X.R.

252—477, 472